United States Patent Office 3,616,588
Patented Nov. 2, 1971

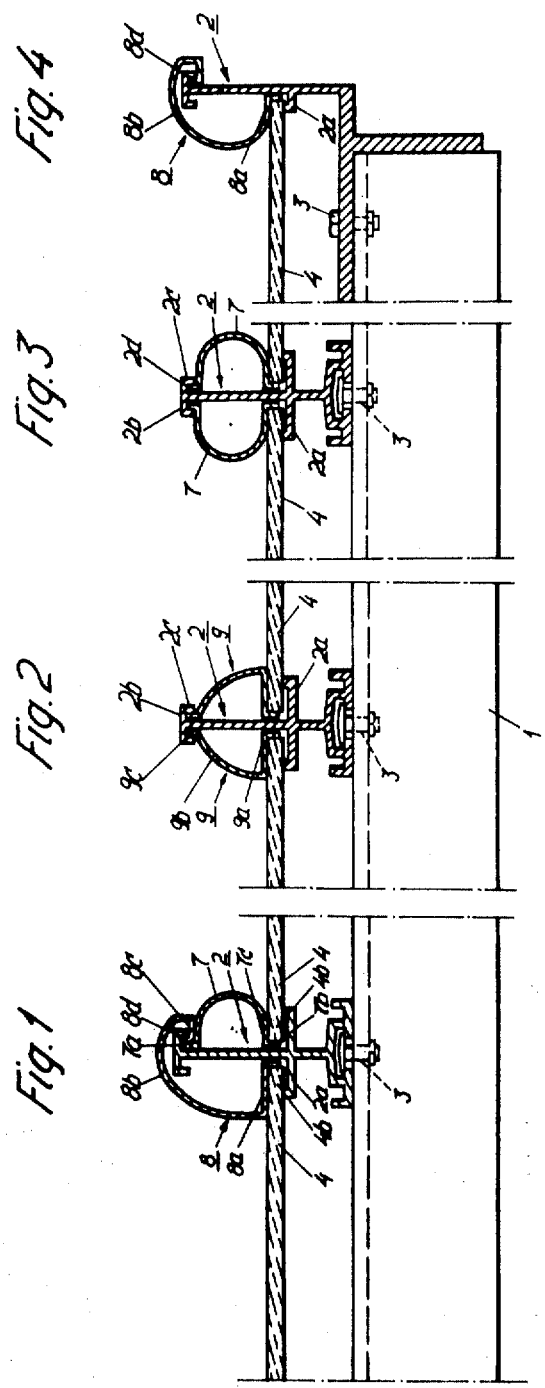

3,616,588
MOLDING FOR USE IN GLAZING GREENHOUSE
FRAMES AND THE LIKE
Kurt Ake Valdemar Hansson, Hishult, Sweden
Filed Nov. 25, 1968, Ser. No. 778,552
Claims priority, application Sweden, June 6, 1968,
7,566/68
Int. Cl. E06b *3/60*
U.S. Cl. 52—495               2 Claims

ABSTRACT OF THE DISCLOSURE

A moulding, for use in glazing greenhouse frames and the like, has a strip of resiliently flexible material bent in parallel relation to its longitudinal axis at approximately right angles so as to include one straight leg and one convexly curved leg, and has edge portions bent in directions away from each other respectively for fitting the edge of the pane and for hooking into a structural element of the frame.

---

The present invention relates to a molding for use in fitting glass panes into frames of greenhouses and other buildings, especially farm buildings.

The invention has for its object to provide a simple and cheaply produced element by which both single and double panes can be easily and rigidly fitted to the building frame without the use of any additional fastening means, such as putty, screws or nails, nor any tools.

The invention is mainly characterise in that the moulding is constituted by a strip of resiliently flexible material bent in parallel relation to its longitudinal axis so as to include one straight leg and one convexly curved leg, and having edge portions bent in directions away from each each other for fitting the edge of the pane and for fixation to a structural element of said frame, respectively.

Owing to this configuration, and because of its resilient flexibility, the molding can be flexed together manually to an extent permitting its outwardly bent edges to be hooked, on one hand, onto the edge of the pane and, on the other hand, onto the frame, this establishing surface contact between its straight leg and the edge portion of the pane to impart to this edge portion a uniformly distributed resilient pressure to force the pane against said frame element.

The molding may have any of several possible cross-sectional shapes. Its curved leg may be so dimensioned, for example, as to enable the molding to be hooked to the frame element at the sides thereof remote from the pane. This will cause the molding to cover the frame element exteriorly and to form a protection therefor, at the same time improving the external appearance of the frame.

The invention is illustrated diagrammatically in the accompanying drawing, in which FIGS. 1 to 4 show in cross section and by way of example, four differently shaped moldings for use in glazing greenhouse roofs, the sections being taken longitudinally through the roof and perpendicularly to the roof fall.

Referring to the drawing more particularly, numeral 1 designates a roof girder extending longitudinally of the greenhouse and to which shaped-iron rafters generally designated by 2 are secured by bolts 3. Between the rafters 2, panes 4 are fitted in rows extending from the crest of the roof to the lower edge of the roof fall, and possibly in overlapping relation. The panes 4 are supported on lateral flanges 2a projecting at right angles from the rafters 2. Each rafter 2 is formed at its top edge with a cross-head 2b having depending edges 2c defining inverted channels 2d on either side of the web 2e of the rafter.

The panes 4 are retained by moldings which are shown in FIGS. 1 to 4 in four different configurations, respectively, and which are made of a resiliently flexible strip material. In FIG. 1, a cross-sectionally U-shaped molding 7 is shown at the right-hand side of the rafter 2, this molding having an upwardly bent lateral edge 7a thereof hooked into one channel 2d of the rafter, its opposite lateral edge 7b engaging the edge of pane 4. With its flat portion 7c adjacent said last-mentioned lateral edge 7b, molding 7 is supported on the top surface of the edge portion 4b of pane 4, thereby forcing this edge portion, and thus the pane, against the flange 2a of rafter 2. Shown at the left-hand side of rafter 2 is a molding generally designated by 8 and comprising a flat portion 8a and an arcuately curved portion 8b, the latter being extended past the top edge of rafter 2 and bent downward to the right of the latter and then formed into a portion 8c bent inwardly toward the rafter and terminating in an edge portion 8d bent upward at right angles to said portion 8c, this edge portion thus engaging the same channel 2d which is engaged also by the lateral edge 7a of molding 7. Thus, in this embodiment, as well, the molding 8 engages the edge portion 4b of pane 4 with a flat portion 8a of this molding.

In FIG. 2, the moldings generally designated by 9 and disposed at either sides of rafter 2 are substantially similar in shape to the left-hand molding of FIG. 1, i.e. with a straight leg 9a and an arcuately curved leg 9b. However, the latter leg is not extended past the top edge of rafter 2 but is formed with an upwardly directed edge flange 9c which engages the channel 2d disposed at the same side of the web of the rafter.

FIG. 3 illustrates two identical moldings 7 similar in cross-sectional shape to those at the right-hand side of rafter 2 in FIG. 1.

Finally, as shown in FIG. 4, the moldings used at the ends of the roof may be shaped either as the moldings 7 or as moldings 8.

The moldings thus described can easily be fitted by first contracting the same slightly by hand and then inserting the moldings between the edge of the pane and the top head 2b of the rafter 2, after which, upon their subsequent application, they will press the pane into firm engagement with the flange 2a.

The moldings can be used for fitting both single and double panes, as well as edge-overlapping panes, into greenhouse frames. Further, they may be used also in other portions of the building frame, such as in the walls, for example.

Instead of the T-sectioned rafter head 2b, the latter could be in the form of a square sectioned tube formed in two opposite sides with longitudinally extending slots for receiving the edge-flanges of the moldings 7 to 9.

I claim:
1. The combination of a pane and a frame rafter element with a molding for use in glazing greenhouse frames and the like, comprising a strip of resiliently flexible material bent in parallel relation to its longitudinal axis so as to include one straight leg and one convexly curved leg, and having edge portions bent in directions away from each other and fitted to the edge of said pane and hooked into said rafter element of the frame respectively, said curved leg being extended past the top of said element and engaged with said frame element only on the side thereof remote from said pane.

2. The combination, according to claim 1 wherein edge flanges of a second strip, different in shape from said first strip, are hooked to the frame element at the same slot means as said edge flanges of said strip.

References Cited
UNITED STATES PATENTS

| | | | |
|---|---|---|---|
| 1,073,805 | 9/1913 | Kinnear | 52—502 |
| 2,171,319 | 8/1939 | Williams | 52—502 |
| 2,604,061 | 7/1952 | Estey | 52—398 |
| 2,714,432 | 8/1955 | Blanchard | 52—502 |
| 2,983,002 | 5/1961 | McEvoy | 52—502 |
| 3,310,923 | 3/1967 | DeRidder | 52—502 |
| 1,988,647 | 1/1935 | Emerson | 52—469 |

FOREIGN PATENTS

| | | | |
|---|---|---|---|
| 1,527,839 | 4/1968 | France | 52—502 |

JOHN E. MURTAGH, Primary Examiner

U.S. Cl. X.R.

52—502